(12) United States Patent
Kwon et al.

(10) Patent No.: US 9,611,919 B1
(45) Date of Patent: Apr. 4, 2017

(54) PLANETARY GEAR TRAIN OF AUTOMATIC TRANSMISSION FOR VEHICLE

(71) Applicant: Hyundai Motor Company, Seoul (KR)

(72) Inventors: Hyun Sik Kwon, Seoul (KR); Seong Wook Hwang, Gunpo-si (KR); Wonmin Cho, Hwaseong-si (KR); Jae Chang Kook, Hwaseong-si (KR); Seongwook Ji, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/147,734

(22) Filed: May 5, 2016

(30) Foreign Application Priority Data

Oct. 15, 2015 (KR) ........................ 10-2015-0144303

(51) Int. Cl.
  *F16H 3/66* (2006.01)
(52) U.S. Cl.
  CPC ......... *F16H 3/66* (2013.01); *F16H 2200/006* (2013.01); *F16H 2200/201* (2013.01); *F16H 2200/2046* (2013.01)
(58) Field of Classification Search
  None
  See application file for complete search history.

(56) References Cited

U.S. PATENT DOCUMENTS

| | | | |
|---|---|---|---|
| 2008/0119318 A1* | 5/2008 | Phillips | F16H 3/663 475/276 |
| 2010/0179015 A1* | 7/2010 | Phillips | F16H 3/66 475/275 |
| 2012/0142485 A1* | 6/2012 | Hoffman | F16H 3/663 475/271 |
| 2014/0080656 A1* | 3/2014 | Lippert | F16H 3/66 475/275 |
| 2015/0300490 A1* | 10/2015 | Iwasaki | F16H 61/686 475/146 |

FOREIGN PATENT DOCUMENTS

JP  2012-13209 A   1/2012
JP  2012-229796 A  11/2012

* cited by examiner

*Primary Examiner* — Justin Holmes
(74) *Attorney, Agent, or Firm* — Morgan, Lewis & Bockius LLP

(57) ABSTRACT

Eight or more forward speeds and at least one reverse speed is achieved by a planetary gear train of an automatic transmission for a vehicle including an input shaft, an output shaft, three planetary gear sets respectively having three rotation-elements, and six control elements for selectively interconnecting the rotation elements.

10 Claims, 2 Drawing Sheets

FIG. 2

| shift-stage | C1 | C2 | C3 | C4 | C5 | C6 | gear ratio |
|---|---|---|---|---|---|---|---|
| D1 | ● | | | ● | ● | | 3.500 |
| D2 | ● | | ● | | ● | | 2.305 |
| D3 | ● | | | | ● | ● | 1.817 |
| D4 | ● | ● | | | ● | | 1.000 |
| D5 | | ● | | | ● | ● | 0.673 |
| D6 | | ● | ● | | ● | | 0.478 |
| D7 | | ● | ● | | | ● | 0.370 |
| D8 | ● | ● | ● | | | | 0.314 |
| REV | ● | | ● | ● | | | -3.500 |

PLANETARY GEAR TRAIN OF AUTOMATIC TRANSMISSION FOR VEHICLE

CROSS-REFERENCE TO RELATED APPLICATION

The present application claims priority to and the benefit of Korean Patent Application No. 10-2015-0144303 filed on Oct. 15, 2015, the entire contents of which is incorporated herein for all purposes by this reference.

BACKGROUND OF THE INVENTION

Field of the Invention

The present invention relates to an automatic transmission for a vehicle.

Description of Related Art

Recent increases in oil prices are triggering a hard competition in enhancing fuel consumption of a vehicle.

In this sense, research on an engine has been undertaken to achieve weight reduction and to enhance fuel consumption by so-called downsizing, and research on an automatic transmission has been performed to simultaneously provide better drivability and fuel consumption by achieving more shift stages.

In order to achieve more shift stages for an automatic transmission, the number of parts is typically increased, which may deteriorate installability, production cost, weight, and/or power flow efficiency.

Therefore, in order to maximally enhance fuel consumption of an automatic transmission having more shift stages, it is important for better efficiency to be derived by a smaller number of parts.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of, by minimal complexity, realizing at least eight forward speeds and at least one reverse speed, thereby improving power delivery performance and fuel consumption due to multi-stages, and improving driving stability of a vehicle by utilizing a low rotation speed of an engine.

An exemplary embodiment of the present invention includes an input shaft for receiving an engine torque, an output shaft for outputting a shifted torque, a first planetary gear set having first, second, and third rotational elements, a second planetary gear set having fourth, fifth, and sixth rotational elements, and a third planetary gear set having seventh, eighth, and ninth rotational elements, and six control elements selectively connecting rotational elements.

A first connecting member may be connected with the first rotational element and selectively connectable with the input shaft. A second connecting member may be connected with the second rotational element and the fourth rotational element. A third connecting member may be connected with the third rotational element and selectively connectable with the second connecting member. A fourth connecting member may be connected with the fifth rotational element and the ninth rotational element, selectively connectable with the second connecting member, and selectively connectable with the input shaft. A fifth connecting member may be connected with the sixth rotational element and directly connected with the transmission housing. A sixth connecting member connected with the seventh rotational element and selectively connectable with the first connecting member. A seventh connecting member may be connected with the eighth rotational element, selectively connectable with the third connecting member, and directly connected with the output shaft.

The first planetary gear set may be a single pinion planetary gear set having a first sun gear, a first planet carrier, and a first ring gear, where the first rotational element is the first sun gear, the second rotational element is the first planet carrier, the third rotational element is the first ring gear. The second planetary gear set may be a single pinion planetary gear set having a second sun gear, a second planet carrier, and a second ring gear, where the fourth rotational element is the second sun gear, the fifth rotational element is the second planet carrier, and the sixth rotational element is the second ring gear. The third planetary gear set may be a single pinion planetary gear set having a third sun gear, a third planet carrier, and a third ring gear, where the seventh rotational element is the third sun gear, the eighth rotational element is the third planet carrier, and the ninth rotational element is the third ring gear.

The six control elements may include a first clutch selectively connecting the input shaft and the first connecting member, a second clutch selectively connecting the input shaft and the fourth connecting member, a third clutch selectively connecting the third connecting member and the seventh connecting member, a fourth clutch selectively connecting the second connecting member and the fourth connecting member, a fifth clutch selectively connecting the first connecting member and the sixth connecting member, and a sixth clutch selectively connecting the second connecting member and the third connecting member.

Shift stages realized by selective operation of the six control elements may include a forward first speed formed by simultaneous operation of the first, fourth, and fifth clutches, a forward second speed formed by simultaneous operation of the first, third, and fifth clutches, a forward third speed formed by simultaneous operation of the first, fifth, and sixth clutches, a forward fourth speed formed by simultaneous operation of the first, second, and fifth clutches, a forward fifth speed formed by simultaneous operation of the second, fifth, and sixth clutches, a forward sixth speed formed by simultaneous operation of the second, third, and fifth clutches, a forward seventh speed formed by simultaneous operation of the second, third, and sixth clutches, a forward eighth speed formed by simultaneous operation of the first, second, and third clutches, and a reverse speed formed by simultaneous operation of the first, third, and fourth clutches.

A planetary gear train according to an exemplary embodiment of the present invention may realize at least eight forward speeds and at least one reverse speed formed by operating the three planetary gear sets as simple planetary gear sets by controlling six control elements.

In addition, a planetary gear train according to an exemplary embodiment of the present invention may substantially improve driving stability by realizing shift stages appropriate for rotation speed of an engine due to multi-stages of an automatic transmission.

In addition, a planetary gear train according to an exemplary embodiment of the present invention may maximize engine driving efficiency by multi-stages of an automatic transmission, and may improve power delivery performance and fuel consumption.

Further, effects that can be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart for respective control elements at respective shift stages in a planetary gear train according to an exemplary embodiment of the present invention.

Figure 1:
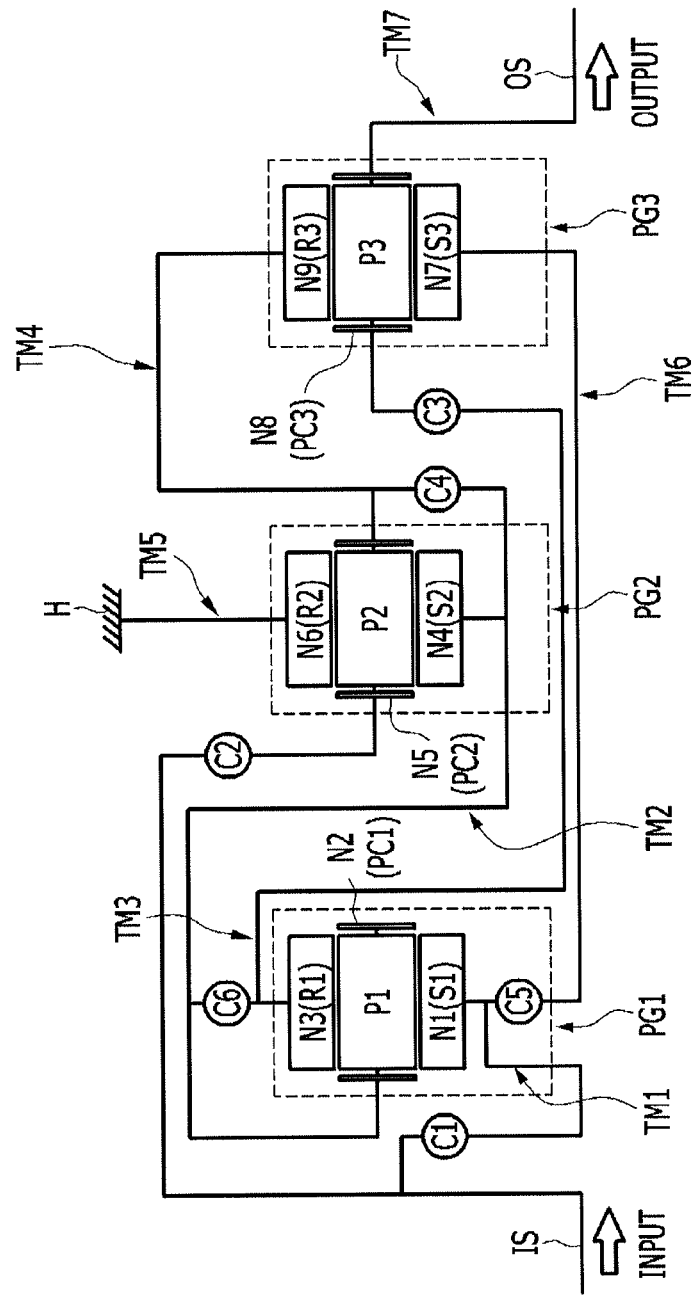
FIG. 1 is a schematic diagram of a planetary gear train according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

In the following description, dividing names of components into first, second, and the like is to divide the names because the names of the components are the same as each other and an order thereof is not particularly limited.

FIG. 1 is a schematic diagram of a planetary gear train according to an exemplary embodiment of the present invention.

Referring to FIG. 1, a planetary gear train according to an exemplary embodiment of the present invention includes first, second, and third planetary gear sets PG1, PG2, and PG3 arranged on a same axis, an input shaft IS, an output shaft OS, seven connecting members TM1 to TM7 for interconnecting rotational elements of the first, second, and third planetary gear sets PG1, PG2, and PG3, six control elements C1 to C6, and a transmission housing H.

Torque input from the input shaft IS is shifted by cooperative operation of the first, second, and third planetary gear sets PG1, PG2, and PG3, and then output through the output shaft OS.

The simple planetary gear sets PG1, PG2, PG3, and PG4 are arranged in the order of first, second, and third planetary gear sets PG1, PG2, and PG3, from an engine side.

The input shaft IS is an input member and the torque from a crankshaft of an engine, after being torque-converted through a torque converter, is input into the input shaft IS.

The output shaft OS is an output member, and being arranged on a same axis with the input shaft IS, delivers a shifted torque to a drive shaft through a differential apparatus.

The first planetary gear set PG1 is a single pinion planetary gear set, and includes a first sun gear S1, a first planet carrier PC1 that supports a first pinions P1 externally engaged with the first sun gear S1, and a first ring gear R1 internally engaged with the first pinions P1. The first sun gear S1 acts as a first rotational element N1, the first planet carrier PC1 acts as a second rotational element N2, and the first ring gear R1 acts as a third rotational element N3.

The second planetary gear set PG2 is a single pinion planetary gear set, and includes a second sun gear S2, a second planet carrier PC2 that supports a second pinions P2 externally engaged with the second sun gear S2, and a second ring gear R2 internally engaged with the second pinions P2. The second sun gear S2 acts as a fourth rotational element N4, the second planet carrier PC2 acts as a fifth rotational element N5, and the second ring gear R2 acts as a sixth rotational element N6.

The third planetary gear set PG3 is a single pinion planetary gear set, and includes a third sun gear S3, a third planet carrier PC3 that supports a third pinions P3 externally engaged with the third sun gear S3, and a third ring gear R3 internally engaged with the third pinions P3. The third sun gear S3 acts as a seventh rotational element N7, the third planet carrier PC3 acts as an eighth rotational element N8, and the third ring gear R3 acts as a ninth rotational element N9.

In the arrangement of the first, second, and third planetary gear sets PG1, PG2, and PG3, the second rotational element N2 is directly connected with the fourth rotational element N4, and the fifth rotational element N7 is directly connected with the ninth rotational element N9, by the seven connecting members TM1 to TM7.

The seven connecting members TM1 to TM7 are arranged as follows.

The first connecting member TM1 is connected with the first rotational element N1 (first sun gear S1), and selectively connectable with the input shaft IS.

The second connecting member TM2 is connected with the second rotational element N2 (first planet carrier PC1) and the fourth rotational element N4 (second sun gear S2).

The third connecting member TM3 is connected with the third rotational element N3 (first ring gear R1), and selectively connectable with the second connecting member TM2.

The fourth connecting member TM4 is connected with the fifth rotational element N5 (second planet carrier PC2) and the ninth rotational element N9 (third ring gear R3), and selectively connectable with the second connecting member TM2.

The fifth connecting member TM5 is connected with the sixth rotational element N6 (second ring gear R2), and directly connected with the transmission housing H The sixth connecting member TM6 is connected with the seventh rotational element N7 (third sun gear S3), and selectively connectable with the first connecting member TM1.

The seventh connecting member TM7 is connected with the eighth rotational element N8 (third planet carrier PC3), and selectively connectable with the third connecting member TM3 while being directly connected with the output shaft OS.

The connecting members TM1 to TM7 may be selectively interconnected with one another by control elements of six clutches C1, C2, C3, C4, C5, and C6.

The six control elements C1 to C6 are arranged as follows.

The first clutch C is arranged between the input shaft IS and the first connecting member TM1, such that the input shaft IS and the first connecting member TM1 may selectively become integral.

The second clutch C2 is arranged between the input shaft IS and the fifth connecting member TM5, such that the input shaft IS and the fifth connecting member TM5 may selectively become integral.

The third clutch C3 is arranged between the third connecting member TM3 and the seventh connecting member TM7, such that the third connecting member TM3 and the seventh connecting member TM7 may selectively become integral.

the fourth clutch C4 is arranged between the second connecting member TM2 and the fourth connecting member TM4 is arranged between, such that second connecting member TM2 and the fourth connecting member TM4 may selectively become integral.

the fifth clutch C5 is arranged between the second connecting member TM2 and the sixth connecting member TM6 is arranged between, such that second connecting member TM2 and the sixth connecting member TM6 may selectively become integral.

the sixth clutch C6 is arranged between the second connecting member TM2 and the third connecting member TM3 is arranged between, such that second connecting member TM2 and the third connecting member TM3 may selectively become integral.

The control elements of the first, second, third, fourth, fifth, and sixth clutches C1, C2, C3, C4, C5, and C6 may be realized as multi-plate hydraulic pressure friction devices that are frictionally engaged by hydraulic pressure.

FIG. 2 is an operational chart for respective control elements at respective shift stages in a planetary gear train according to an exemplary embodiment of the present invention.

As shown in FIG. 2, a planetary gear train according to an exemplary embodiment of the present invention performs shifting as follows, by operating three control elements at respective shift stages.

In the forward first speed D1, the first, fourth, and fifth clutches C1, C4, and C5 are simultaneously operated. As a result, the input shaft IS and the first connecting member TM1 are interconnected by the operation of the first clutch C1. The second connecting member TM2 and the fourth connecting member TM4 are interconnected by the operation of the fourth clutch C4. The first connecting member TM1 and the sixth connecting member TM6 are interconnected by the operation of the fifth clutch C5, and torque is input to the first connecting member TM1. In addition, the fifth connecting member TM5 acts as a fixed element, and thereby realizing the forward first speed and outputting a shifted torque through the output shaft OS connected with the seventh connecting member TM7.

In the forward second speed D2, the first, third, and fifth clutches C1, C3, and C5 are simultaneously operated. As a result, the input shaft IS and the first connecting member TM1 are interconnected by the operation of the first clutch C1. third connecting member TM3 and the seventh connecting member TM7 are interconnected by the operation of the third clutch C3. The first connecting member TM1 and the sixth connecting member TM6 are interconnected by the operation of the fifth clutch C5, and torque is input to the first connecting member TM1. In addition, the fifth connecting member TM5 acts as a fixed element, and thereby realizing the forward second speed and outputting a shifted torque through the output shaft OS connected with the seventh connecting member TM7.

In the forward third speed D3, the first, fifth, and sixth clutches C1, C5, and C6 are simultaneously operated. As a result, the input shaft IS and the first connecting member TM1 are interconnected by the operation of the first clutch C1. The first connecting member TM1 and the sixth connecting member TM6 are interconnected by the operation of the fifth clutch C5. The second connecting member TM2 and the third connecting member TM3 are interconnected by the operation of the sixth clutch C6, and torque is input to the first connecting member TM1. In addition, the fifth connecting member TM5 acts as a fixed element, and thereby realizing the forward third speed and outputting a shifted torque through the output shaft OS connected with the seventh connecting member TM7.

In the forward fourth speed D4, the first, second, and fifth clutches C1, C2, and C5 are simultaneously operated. As a result, the input shaft IS and the first connecting member TM1 are interconnected by the operation of the first clutch C1. The input shaft IS and the fourth connecting member TM4 are interconnected by the operation of the second clutch C2. The first connecting member TM1 and the sixth connecting member TM6 are interconnected by the operation of the fifth clutch C5, and torque is input to the first connecting member TM1 and the fourth connecting member TM4. In addition, the fifth connecting member TM5 acts as a fixed element, and thereby realizing the forward fourth speed and outputting a shifted torque through the output shaft OS connected with the seventh connecting member TM7.

In the forward fifth speed D5, the second, fifth, and sixth clutches C2, C5, and C6 are simultaneously operated. As a result, the input shaft IS and the fourth connecting member TM4 are interconnected by the operation of the second clutch C2. The first connecting member TM1 and the sixth connecting member TM6 are interconnected by the operation of the fifth clutch C5. The second connecting member TM2 and the third connecting member TM3 are interconnected by the operation of the sixth clutch C6, and torque is input to the fourth connecting member TM4. In addition, the fifth connecting member TM5 acts as a fixed element, and thereby realizing the forward fifth speed and outputting a shifted torque through the output shaft OS connected with the seventh connecting member TM7.

In the forward sixth speed D6, the second, third, and fifth clutches C2, C3, and C5 are simultaneously operated. As a result, the input shaft IS and the fourth connecting member TM4 are interconnected by the operation of the second clutch C2. The third connecting member TM3 and the seventh connecting member TM7 are interconnected by the operation of the third clutch C3. The first connecting member TM1 and the sixth connecting member TM6 are interconnected by the operation of the fifth clutch C5, and torque is input to the fourth connecting member TM4. In addition, the fifth connecting member TM5 acts as a fixed element, and thereby realizing the forward sixth speed and outputting a shifted torque through the output shaft OS connected with the seventh connecting member TM7.

In the forward seventh speed D7, the second, third, and sixth clutches C2, C3, and C6 are simultaneously operated. As a result, the input shaft IS and the fourth connecting member TM4 are interconnected by the operation of the second clutch C2. The third connecting member TM3 and the seventh connecting member TM7 are interconnected by the operation of the third clutch C3. The second connecting member TM2 and the third connecting member TM3 are interconnected by the operation of the sixth clutch C6, and torque is input to the fourth connecting member TM4. In addition, the fifth connecting member TM5 acts as a fixed element, and thereby realizing the forward seventh speed and outputting a shifted torque through the output shaft OS connected with the seventh connecting member TM7.

In the forward eighth speed D8, the first, second, and third clutches C1, C2, and C3 are simultaneously operated. As a result, the input shaft IS and the first connecting member TM1 are interconnected by the operation of the first clutch C1. The input shaft IS and the fourth connecting member TM4 are interconnected by the operation of the second clutch C2. The third connecting member TM3 and the seventh connecting member TM7 are interconnected by the operation of the third clutch C3, and torque is input to the first connecting member TM1 and the fourth connecting member TM4. In addition, the fifth connecting member TM5 acts as a fixed element, and thereby realizing the forward eighth speed and outputting a shifted torque through the output shaft OS connected with the seventh connecting member TM7.

In the reverse speed REV, the first, third, and fourth clutches C1, C3, and C4 are simultaneously operated. As a result, the input shaft IS and the first connecting member TM1 are interconnected by the operation of the first clutch C1. The third connecting member TM3 and the seventh connecting member TM7 are interconnected by the operation of the third clutch C3. The second connecting member TM2 and the fourth connecting member TM4 are interconnected by the operation of the fourth clutch C4, and torque is input to the first connecting member TM1. In addition, the fifth connecting member TM5 acts as a fixed element, and thereby realizing the reverse speed and outputting a shifted torque through the output shaft OS connected with the seventh connecting member TM7.

As described above, a planetary gear train according to an exemplary embodiment of the present invention may realize at least eight forward speeds and at least one reverse speed formed by operating three planetary gear sets PG1, PG2, and PG3 by controlling six clutches C1, C2, C3, C4, C5, and C6.

In addition, a planetary gear train according to an exemplary embodiment of the present invention may substantially improve driving stability by realizing shift stages appropriate for rotation speed of an engine due to multi-stages of an automatic transmission.

In addition, a planetary gear train according to an exemplary embodiment of the present invention may maximize engine driving efficiency by multi-stages of an automatic transmission, and may improve power delivery performance and fuel consumption.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
    an input shaft configured for receiving an engine torque;
    an output shaft configured for outputting a shifted torque;
    a first planetary gear set having first, second, and third rotation elements;
    a second planetary gear set having fourth, fifth, and sixth rotation elements;
    a third planetary gear set having seventh, eighth, and ninth rotation elements;
    six control elements for selectively interconnecting the first, second, third, fourth, fifth, sixth, seventh, eighth, and ninth rotation elements;
    a first connecting member connected with the first rotation element and selectively connectable with the input shaft;
    a second connecting member connected with the second rotation element and the fourth rotation element;
    a third connecting member connected with the third rotation element and selectively connectable with the second connecting member;
    a fourth connecting member connected with the fifth rotation element and the ninth rotation element, selectively connectable with the second connecting member, and selectively connectable with the input shaft;
    a fifth connecting member connected with the sixth rotation element and directly connected with a transmission housing;
    a sixth connecting member connected with the seventh rotation element and selectively connectable with the first connecting member; and
    a seventh connecting member connected with the eighth rotation element,
    selectively connectable with the third connecting member, and directly connected with the output shaft.

2. The planetary gear train of claim 1, wherein
the first planetary gear set is a single pinion planetary gear set having a first sun gear, a first planet carrier, and a first ring gear, where the first rotation element is the first sun gear, the second rotation element is the first planet carrier, the third rotation element is the first ring gear;
the second planetary gear set is a single pinion planetary gear set having a second sun gear, a second planet carrier, and a second ring gear, where the fourth rotation element is the second sun gear, the fifth rotation element is the second planet carrier, and the sixth rotation element is the second ring gear; and
the third planetary gear set is a single pinion planetary gear set having a third sun gear, a third planet carrier, and a third ring gear, where the seventh rotation element is the third sun gear, the eighth rotation element is the third planet carrier, and the ninth rotation element is the third ring gear.

3. The planetary gear train of claim 1, wherein the six control elements comprise:
a first clutch selectively connecting the input shaft and the first connecting member;
a second clutch selectively connecting the input shaft and the fourth connecting member;
a third clutch selectively connecting the third connecting member and the seventh connecting member;
a fourth clutch selectively connecting the second connecting member and the fourth connecting member;
a fifth clutch selectively connecting the first connecting member and the sixth connecting member; and
a sixth clutch selectively connecting the second connecting member and the third connecting member.

4. The planetary gear train of claim 3, wherein shift stages realized by selective operation of the six control elements comprise:
a forward first speed formed by simultaneous operation of the first, fourth, and fifth clutches;
a forward second speed formed by simultaneous operation of the first, third, and fifth clutches;
a forward third speed formed by simultaneous operation of the first, fifth, and sixth clutches;
a forward fourth speed formed by simultaneous operation of the first, second, and fifth clutches;
a forward fifth speed formed by simultaneous operation of the second, fifth, and sixth clutches;
a forward sixth speed formed by simultaneous operation of the second, third, and fifth clutches;
a forward seventh speed formed by simultaneous operation of the second, third, and sixth clutches;
a forward eighth speed formed by simultaneous operation of the first, second, and third clutches; and
a reverse speed formed by simultaneous operation of the first, third, and fourth clutches.

5. A planetary gear train of an automatic transmission for a vehicle, comprising:
an input shaft configured for receiving an engine torque;
an output shaft configured for outputting a shifted torque;
a first planetary gear set having first, second, and third rotation elements;
a second planetary gear set having fourth, fifth, and sixth rotation elements;
a third planetary gear set having seventh, eighth, and ninth rotation elements;
a first connecting member connected with the first rotation element and selectively connectable with the input shaft;
a second connecting member connected with the second rotation element and the fourth rotation element;
a third connecting member connected with the third rotation element and selectively connectable with the second connecting member;
a fourth connecting member connected with the fifth rotation element and the ninth rotation element, selectively connectable with the second connecting member, and selectively connectable with the input shaft;
a fifth connecting member connected with the sixth rotation element and directly connected with a transmission housing;
a sixth connecting member connected with the seventh rotation element and selectively connectable with the first connecting member;
a seventh connecting member connected with the eighth rotation element, selectively connectable with the third connecting member, and directly connected with the output shaft;
a first clutch selectively connecting the input shaft and the first connecting member;
a second clutch selectively connecting the input shaft and the fourth connecting member;
a third clutch selectively connecting the third connecting member and the seventh connecting member;
a fourth clutch selectively connecting the second connecting member and the fourth connecting member;
a fifth clutch selectively connecting the first connecting member and the sixth connecting member; and
a sixth clutch selectively connecting the second connecting member and the third connecting member.

6. The planetary gear train of claim 5, wherein
the first planetary gear set is a single pinion planetary gear set having a first sun gear, a first planet carrier, and a first ring gear, where the first rotation element is the first sun gear, the second rotation element is the first planet carrier, and the third rotation element is the first ring gear;
the second planetary gear set is a single pinion planetary gear set having a second sun gear, a second planet carrier, and a second ring gear, where the fourth rotation element is the second sun gear, the fifth rotation element is the second planet carrier, and the sixth rotation element is the second ring gear; and
the third planetary gear set is a single pinion planetary gear set having a third sun gear, a third planet carrier, and a third ring gear, where the seventh rotation element is the third sun gear, the eighth rotation element is the third planet carrier, and the ninth rotation element is the third ring gear.

7. The planetary gear train of claim 5, wherein shift stages realized by selective operation of the six clutches comprise:
a forward first speed formed by simultaneous operation of the first, fourth, and fifth clutches;
a forward second speed formed by simultaneous operation of the first, third, and fifth clutches;
a forward third speed formed by simultaneous operation of the first, fifth, and sixth clutches;
a forward fourth speed formed by simultaneous operation of the first, second, and fifth clutches;
a forward fifth speed formed by simultaneous operation of the second, fifth, and sixth clutches;
a forward sixth speed formed by simultaneous operation of the second, third, and fifth clutches;
a forward seventh speed formed by simultaneous operation of the second, third, and sixth clutches;

a forward eighth speed formed by simultaneous operation of the first, second, and third clutches; and a reverse speed formed by simultaneous operation of the first, third, and fourth clutches.

8. A planetary gear train of an automatic transmission for a vehicle, comprising:

an input shaft configured for receiving an engine torque;

an output shaft configured for outputting a shifted torque;

a first planetary gear set of a single pinion planetary gear set having a first sun gear, a first planet carrier, and a first ring gear;

a second planetary gear set of a single pinion planetary gear set having a second sun gear, a second planet carrier, and a second ring gear;

a third planetary gear set of a single pinion planetary gear set having a third sun gear, a third planet carrier, and a third ring gear;

a first connecting member connected with the first sun gear and selectively connectable with the input shaft;

a second connecting member connected with the first planet carrier and the second sun gear;

a third connecting member connected with the first ring gear and selectively connectable with the second connecting member;

a fourth connecting member connected with the second planet carrier and the third ring gear and selectively connectable with the input shaft;

a fifth connecting member connected with the second ring gear and directly connected with a transmission housing;

a sixth connecting member connected with the third sun gear and selectively connectable the first connecting member;

a seventh connecting member connected with the third planet carrier, selectively connectable with the third connecting member, and directly connected with the output shaft: and six control elements arranged for selective connection of the connecting members.

9. The planetary gear train of claim 8, wherein the six control elements comprise:

a first clutch selectively connecting the input shaft and the first connecting member;

a second clutch selectively connecting the input shaft and the fourth connecting member;

a third clutch selectively connecting the third connecting member and the seventh connecting member;

a fourth clutch selectively connecting the second connecting member and the fourth connecting member;

a fifth clutch selectively connecting the first connecting member and the sixth connecting member; and a sixth clutch selectively connecting the second connecting member and the third connecting member.

10. The planetary gear train of claim 9, wherein shift stages realized by selective operation of the six control elements comprise:

a forward first speed formed by simultaneous operation of the first, fourth, and fifth clutches;

a forward second speed formed by simultaneous operation of the first, third, and fifth clutches;

a forward third speed formed by simultaneous operation of the first, fifth, and sixth clutches;

a forward fourth speed formed by simultaneous operation of the first, second, and fifth clutches;

a forward fifth speed formed by simultaneous operation of the second, fifth, and sixth clutches;

a forward sixth speed formed by simultaneous operation of the second, third, and fifth clutches;

a forward seventh speed formed by simultaneous operation of the second, third, and sixth clutches;

a forward eighth speed formed by simultaneous operation of the first, second, and third clutches; and a reverse speed formed by simultaneous operation of the first, third, and fourth clutches.

* * * * *